(12) United States Patent
Abd Alkareem Alayasra et al.

(10) Patent No.: US 12,368,619 B2
(45) Date of Patent: Jul. 22, 2025

(54) APPARATUS AND METHOD FOR AN IMPROVED TRANSMITTER FOR MULTI-SERVICE RADIO NETWORKS

(71) Applicant: Ulak Haberlesme A.S., Ankara (TR)

(72) Inventors: Mus'ab Mahmoud Abd Alkareem Alayasra, Istanbul (TR); Ahmet Enes Duranay, Istanbul (TR); Huseyin Arslan, Istanbul (TR)

(73) Assignee: Ulak Haberlesme A.S., Ankara (TR)

( * ) Notice: Subject to any disclaimer, the term of this patent is extended or adjusted under 35 U.S.C. 154(b) by 452 days.

(21) Appl. No.: 18/070,496

(22) Filed: Nov. 29, 2022

(65) Prior Publication Data

US 2023/0208692 A1 Jun. 29, 2023

Related U.S. Application Data

(60) Provisional application No. 63/294,818, filed on Dec. 29, 2021.

(51) Int. Cl.
*H04L 27/26* (2006.01)
(52) U.S. Cl.
CPC .... *H04L 27/26025* (2021.01); *H04L 27/2605* (2013.01); *H04L 27/2634* (2013.01)
(58) Field of Classification Search
None
See application file for complete search history.

(56) References Cited

U.S. PATENT DOCUMENTS

| 8,577,299 | B2 | 11/2013 | Agrawal et al. | |
|---|---|---|---|---|
| 2015/0180622 | A1* | 6/2015 | Yoo | H04L 5/0076 |
| | | | | 370/330 |
| 2017/0201968 | A1* | 7/2017 | Nam | H04B 7/0452 |

(Continued)

FOREIGN PATENT DOCUMENTS

| KR | 101460107 B1 | 11/2014 |
|---|---|---|
| WO | 2017123045 A1 | 7/2017 |
| WO | 2017147021 A1 | 8/2017 |

OTHER PUBLICATIONS

3rd Generation Partnership Project; Technical Specification Group Radio Access Network; NR; Physical channels and modulation (Release 16), 3GPP TS 38.211 V16.7.0, 2021, pp. 1-134.

(Continued)

*Primary Examiner* — Diane L Lo
(74) *Attorney, Agent, or Firm* — Bayramoglu Law Offices LLC

(57) ABSTRACT

An apparatus and method for a multi-service transmitter of an OFDM base station (BS) in a mixed numerology radio access network, wherein the transmitter uses a common cyclic prefix across all service types to eliminate inter-numerology interference (INI) by using a new Frequency Re-sampler (VR) component in the transmitter that converts streams of those services with smaller FFT sizes into a common larger FFT size in the frequency domain, which in effect increases their number of samples. The VR simply causes a multi-service transmitter to mimic a single-service transmitter thereby reducing the required number of ZF precoders to one and causing much fewer number of precoding operations. The transmitter sends resource configuration regarding the use of common CP for all services to each connected UE.

1 Claim, 9 Drawing Sheets

(56) References Cited

U.S. PATENT DOCUMENTS

| | | | | |
|---|---|---|---|---|
| 2017/0290013 A1* | 10/2017 | McCoy | ................. | H04L 5/0007 |
| 2018/0115963 A1* | 4/2018 | Luo | .................... | H04L 27/2604 |
| 2018/0287750 A1* | 10/2018 | Abdoli | ................. | H04W 72/23 |
| 2019/0379488 A1 | 12/2019 | Demir et al. | | |
| 2019/0386862 A1* | 12/2019 | Islam | .................... | H04L 5/0007 |
| 2023/0232410 A1* | 7/2023 | Zhou | ................. | H04W 72/0457 |

OTHER PUBLICATIONS

Ali A. Zaidi, et al., Waveform and Numerology to Support 5G Services and Requirements, IEEE Communication Magazine, 2016, pp. 1-9, vol. 54, No. 11.

Xiaoying Zhang, et al., Mixed Numerologies Interference Analysis and Inter-Numerology Interference Cancellation for Windowed OFDM Systems, IEEE Transactions on Vehicular Technology, 2017, pp. 1-14.

Abuu B. Kihero, et al., Inter-Numerology Interference for Beyond 5G, IEEE Access, 2019, pp. 146512-146523, vol. 7.

Abuu B. Kihero, et al., Inter-Numerology Interference Analysis for 5G and Beyond, 2018 IEEE Globecom Workshops (GC Wkshps), 2018.

Juquan Mao, et al., Interference Analysis and Power Allocation in the Presence of Mixed Numerologies, 2020, pp. 1-16.

Lei Zhang, et al., Subband Filtered Multi-carrier Systems for Multi-service Wireless Communications, 2017, pp. 1-14.

Jaeyoung Choi, et al., A Transceiver Design for Spectrum Sharing in Mixed Numerology Environments, 2019, pp. 1-15.

\* cited by examiner

APPARATUS AND METHOD FOR AN IMPROVED TRANSMITTER FOR MULTI-SERVICE RADIO NETWORKS

CROSS REFERENCE TO THE RELATED APPLICATION

This application claims priority to provisional application 63/294,818 filed on Dec. 29, 2021, the entire content of which is incorporated herein by reference.

TECHNICAL FIELD

The present invention relates generally to wireless networks and more particularly to an apparatus and methods for a base station supporting multiple service types with Multi-Input and Multi-Output (MIMO) transmitters and beamforming.

BACKGROUND

Any discussion of the prior art throughout the specification should in no way be considered as an admission that such prior art is widely known or forms part of common general knowledge in the field.

The fifth generation (5G) of wireless communication defined by International Telecommunication Union (ITU) comes with three key services to support a wide array of emerging applications. These services are enhanced mobile broadband (eMBB), ultra-reliable low latency communications (uRLLC) and massive machine type communications (mMTC). Each service comes with different radio network performance requirements. For example, eMBB enables an application like high-definition video streaming with up to 10 to 20 Gbps data rates. mMTC leverages benefits of low cost of Internet of Things (IoT) and supports millions of small devices, but the corresponding data rates are in the range of 1 to 100 Kbps. The autonomous vehicle network, an emerging key application, is a key use case for uRLLC that enables highly responsive connections with less than 1 millisecond radio channel latency and high network availability. These services come with conflicting requirements. Deploying them in separate standalone radio systems may seem logical, but it would be highly expensive and inefficient. On the other hand, it is challenging to design a unified radio access network (RAN) which meets the requirements for all types of services without causing interference between services. The interference is particularly important in the downlink direction from the base station (BS) towards the plurality of user equipment (UE) served by that base station wherein all downlink traffic is multiplexed onto a single broadcast (shared) radio channel.

Different service requirements can only be supported by different frequency and time domain implementations. For example, mMTC may require a larger symbol duration to support delay-tolerant devices while uRLLC that has a stringent reliability and latency requirements requires a symbol duration that is very small. One viable solution is to multiplex multiple types of services in one baseband system in orthogonal time and/or frequency resources to avoid the interference.

Orthogonal Frequency division multiplexing (OFDM) is chosen by 5G standards for multiplexing different services due to ease of supporting services with different latency and bandwidth requirements. OFDM is in fact a legacy technique that is known for a long time and has found applications in different types of networks. It simply divides the channel/carrier into a plurality of subcarriers' through a mathematical function known as Fourier Transform (FT) wherein the subcarriers are waveforms chosen to be 'orthogonal' to each other in frequency domain Mathematical speaking, when they are orthogonal the integral of two waveforms over the designated time interval is zero. As a result, orthogonal functions are statistically unrelated.

The concept of using a subcarrier can be visualized as subdividing the total channel into parallel subchannels of smaller bandwidth with frequency-flat response, wherein different waveforms become feasible specific to each subcarrier. The bandlimited orthogonal waveforms are then combined with significant overlap while avoiding inter-subchannel interference. Because subcarriers are orthogonal to each other, they will exhibit no interference, resulting in efficient use of bandwidth. The amplitude of each subcarrier waveform crosses zero at the center of all other subcarriers, minimizing adjacent subcarrier impact.

Due to non-linear characteristics of the radio channel, however, the transmitted time domain signals are unavoidably exposed to what is called 'inter-symbol interference (ISI)'. To remedy ISI, a 'guard interval' (a short time-interval) is added between adjacent symbols and a 'cyclic prefix (CP)' is inserted within the guard interval to eliminate ISI coining from the previous symbol. The CP is created in such a way that each OFDM symbol is preceded by a copy of only the end part of the same symbol in time domain. If, for example, the symbol is (1 3 5 7 9 8 8 7 9 1), and CP has length 3, then the prepended symbol becomes (7 9 1 1 3 5 7 9 8 8 7 9 1). CP essentially repeats the end of the symbol so that the linear convolution of a frequency-selective multipath channel can be modeled as circular convolution. When the CP is removed at the receiver (RX), the part of the symbol that is exposed to ISI is essentially removed and the remaining/original symbol is retrieved without any ISI.

FIG. 1 is a basic functional block diagram of a prior arts OFDM Single Input Single Output (SISO) radio system comprised of a single antenna transmitter (TX) 100 (at the base station) and single antenna receiver (RX) 128 (at the user equipment). Let us assume that the transmitter is sending a wideband bit stream to the receiver on the downlink radio channel. We assumed that the transmitter is using N number of subcarriers to transmit. The input bit stream (a series of 0s and 1s) enters the TX on the left side of the diagram. This serial bit stream is first demultiplexed into parallel bit streams by subsystem S/P 101 and then these substreams are fed to the individual Quadrature Amplitude Modulation (QAM) Modulator 102 subsystem, well known in prior art, one for each of the N subcarriers. Each unique grouping of bits is mapped by QAM Modulator into a complex number/symbol (e.g., into a phase and amplitude) in frequency domain. A range of different QAM modulators can be used, starting with BPSK that maps one bit to one symbol, to 256-QAM that maps each 8 bits into one symbol. The series of symbols form the discrete frequency domain representation of the bit stream. Combining modulation with the use of large number of subcarriers results in high throughput.

A key enabler for OFDM is the use of Inverse Fast Fourier Transform (IFFT) 103 subsystem to efficiently create the time domain waveforms (symbols) corresponding to the array of QAM modulated subcarriers shown in FIG. 1. Each subcarrier in time domain simply peaks at the subcarrier frequency. Here, $f_i = i\Delta f + f_0$ and $i = 0, 1, \ldots, N-1$. $\Delta f$ is known as the 'subcarrier spacing', N is the number of subcarriers, and $f_0$ to $f_{N-1}$ defines the frequency channel. While LIE uses a single M value that is 15 Khz and a corresponding single CP duration (4.69 mcsec), 5G New Radio (5G-NR) allows different Δf values of 15, 30, 60, 120, and 240 KHz called numerologies of the parent waveform, i.e., 0, 1, 2, 3, and 4 respectively, where the term numerology refers to the different choice of subcarrier spacing, and the resultant OFDM symbol duration and CP duration. In summary, the OFDM subcarriers are $15*2^\mu$ KHz, $\mu=(0, 1, 2, 3, 4)$ and the corresponding CP's are $4.69/2^\mu$ mcsec for 5G as shown in TABLE 1. More number of numerologies may be used in future generation networks.

TABLE 1

| Parameters | Numerology options (μ) | | | | |
|---|---|---|---|---|---|
| | 0 | 1 | 2 | 3 | 4 |
| Subcarrier Spacing (kHz) | 15 | 30 | 60 | 120 | 240 |
| OFDM Symbol Duration (μs) | 66.67 | 33.33 | 16.67 | 8.33 | 4.17 |
| CP Duration (μs) | 4.69 | 2.34 | 4.17\|1.17 | 0.58 | 0.29 |
| Slot Duration (ms) | 1 | 0.5 | 0.25 | 0.125 | 0.0625 |

Different numerologies can be used to meet the demands of the services. For example, lower numerologies are more suitable for mMTC, since they can support higher number of simultaneously connected devices within the same bandwidth and require lower power. Intermediate numerologies are appropriate for eMBB which requires both high data rate and sizable bandwidth. Highest numerologies are suitable for delay-sensitive applications pertaining to the uRLLC due to use of shorter symbol duration. Using these different numerologies introduces interference between the different services. With a chosen set of design parameters, the orthogonality no longer holds across different services carried by different numerologies and different number of subcarriers per numerology in the downlink radio channel. The non-orthogonality between services results in inter-numerology interference (INT) known in prior art [5-8] that needs to be addressed.

Going back to FIG. 1, the resulting OFDM signal is first serialized back by subsystem P/S 107 and CP is added to each symbol by subsystem 104. The final signal that is in digital form drives the Digital-to-Analog Converter (D/A) 105 which converts it to an analog radio frequency signal. This baseband signal is usually up-converted to a higher frequency (and perhaps amplified) before being transmitted via the over-the-air channel. At receiver 128, the process is simply reversed. An analog downconverter shifts the OFDM signal back to baseband. The Analog-to-Digital Converter, A/D 106 converts the radio signal back to digital form and passes it to S/P 117 and then to the FFT 113 to transform the discrete time domain signal back to discrete frequency domain signal. The series of QAM Demodulators 112 in turn reproduce the bit stream arriving from each subcarrier, which is then multiplexed by P/S 111 to recreate the original serial data stream. In summary, the key operations are (1) combining a plurality of QAM modulated low-bandwidth subcarriers to create a wideband channel for the user's service, and (2) using FFT and IFFT to efficiently process the symbols in frequency domain. Note that FFT and IFFT processes are simple matrix multiplications well known in signal processing.

With multi-input and multi-output (MIMO) antenna systems of 5G, the radio channel broadcasts the same stream by each antenna. Different antennas essentially send traffic in different radio path directions using beamforming which enables multiple synchronized transmissions on the same frequency with minimal or no interference. The RX can retrieve its own data stream from the aggregate data stream.

Precoding (not shown in FIG. 1 for simplicity) is an important process within the TX that is designed based on modeling the current radio channel state information (CSI) in real-time. The goal is to multiply the frequency domain samples of the input at TX with the 'inverse' of the radio channel characteristics to compensate for the channel distortion. In OFDM, an image of so-called 'channel matrix' of each subcarrier is first generated, and then precoding is performed on a per subcarrier basis based on that subchannel realization. At the transmitter side, precoding is performed in frequency domain prior to the IFFT process. The precoder parameters are periodically modified as the radio access network (RAN) performance changes over time. The precoder design is well known in prior art and thus not covered here.

A conventional transmitter supports only a single type of service (as in LTE). Therefore, a single precoder is needed to multiplex data streams of multiple UEs in time domain because all UEs use the same number of OFDM subcarriers, symbol duration and CP duration Thus, one precoder is designed over each subcarrier based on the corresponding subchannel's frequency. Doing so, the interference between services of different UEs is eliminated. For a multi-service system, however, UEs belonging to different services will use different Fourier transformation (FT) sizes. The FT size N (always a power of 2) is an indicative of the number of subcarriers used for the service. Because each service demands a different bandwidth range, the corresponding FT sizes are different. Furthermore, different services use different numerologies. While service $S_0$ uses $\mu=0$ ($\Delta f=15$ Khz) with $N_0$ subcarriers, another service $S_1$ uses $\mu=4$ ($\Delta f=240$ Khz) with $N_1$ subcarriers, which means that they will not experience the same frequency-domain radio channel representation. Those services with a larger number of samples (i.e., larger FFT size) will distribute symbols to large number of OFDM subcarriers while services with smaller number of samples (i.e., smaller FFT size) will use only a subset of the available subcarriers. Precoding will be applied to those subcarriers in-use for the service, and not applied to those subcarriers that are not used by the service. As a result, each service requires a separate precoder at the transmitter (e.g., one with precoding at each $N_0$ subcarrier, and the other one with precoding only at $N_1$ subcarriers). Note that precoding requires a lot of computation. For an $M_T$ antenna transmitter and $M_R$ antenna receivers, and N subcarriers, the precoder must perform precoding for $(M_T M_R N)$ subchannels. These subchannel parameters change over time when the radio channel performance changes. In summary, the frequency response of the channel is different from one service to another and from time to time. With different FFT sizes for two services, the direct precoding approach would require two different precoders, $ZF_1$ and $ZF_2$ performing precoding for $(M_T M_R N_0)$ and $(M_T M_R N_1)$ subchannels, respectively. The interference from smaller size FFT services to larger size FFT services in a multi-service configuration of the transmitter results inter numerology interference (INT). The precoding will eliminate INI across those subcarriers commonly used by both services. However, INI from UEs using $S_0$ will not be eliminated across the rest of the subcarriers that only $S_1$ is using. Furthermore, using additional precoders means additional transmitter complexity. A high price to pay when INI is only partially eliminated.

In summary, the INI problem is partially addressed in frequency domain in prior art by using a plurality of precoders. The main problem is that 'unmatched' number of subcarriers will introduce interference as precoding will not be performed to unseen subcarriers by UEs. More specifically, those UEs with smaller FFT size will interfere on UEs belonging to larger FFT sizes due to uncommon subcarriers. The INI problem can be addressed in time domain to increase spectral efficiency.

A list of prior art related to the instant disclosure:
U.S. Pat. No. 8,577,299 B2 Agrawal et al., 'Wireless Communication System with Configurable Cyclic Prefix Length'.
US 20190379488A1 Demir et al., 'Adaptive guards for mixed numerology systems and associated method of use'.
WO2017123045A1 Nam et. al., 'Method and apparatus for supporting multiple services in wireless communication systems'.
WO2017147021A1 Yoo et al., 'Dynamic Cyclic Prefix Length'.
KR101460107B1 Kwak Hyun-Sun. 'Method and System for changing cyclic prefix length in wireless communications system'.
3rd Generation Partnership Project; Technical Specification Group Radio Access Network; NR; Physical channels and modulation (Release 16) 3GPP TS 38.211 V16.7.0 (2021-09).
A. A. Zaidi, R. Baldemair, H. Tullberg, H. Bjorkegren, L. Sundstrom, J. Medbo, C. Kilinc, and I. Da Silva, "Waveform and numerology to support 5G services and requirements," *IEEE Communication. Magazine*, vol. 54, no. 11, pp. 90-98, November 2016.
X. Zhang, L. Zhang, P. Xiao, D. Ma, J. Wei, and Y. Xin, "Mixed numerologies interference analysis and inter-numerology interference cancellation for windowed OFDM systems," *IEEE Trans. Veh. Tech.*, vol. 67, no. 8, pp. 7047-7061, April 2018.
A. B. Kihero, M. S. J. Solaija and H. Arslan, "Inter-Numerology Interference for Beyond 5G," in IEEE Access, vol. 7, pp. 146512-146523, 2019, doi: 10.1109/IEEE ACCESS. 2019.2946084.
B. Kihero, M. S. J. Solaija, A. Yazar and H. Arslan, "Inter-Numerology Interference Analysis for 5G and Beyond," 2018 *IEEE Globecom Workshops (GC Wkshps)*, 2018, pp. 1-6, doi: 10.1109/GLOCOMW.2018.8644394.
Mao, Juquan, et al. "Interference analysis and power allocation in the presence of mixed numerologies." IEEE Transactions on Wireless Communications 19.8 (2020): 5188-5203.
Zhang, Lei, et al. "Subband filtered multi-carrier systems for multi-service wireless communications." IEEE Transactions on Wireless Communications 16.3 (2017): 1893-1907.
Zhang, Xiaoying, et al. "Mixed numerologies interference analysis and inter-numerology interference cancellation for windowed OFDM systems." IEEE Transactions on Vehicular Technology 67.8 (2018): 7047-7061.
Choi, Jaeyoung, et al. "A transceiver design for spectrum sharing in mixed numerology environments." IEEE Transactions on Wireless Communications 18.5 (2019): 2707-2721.

SUMMARY

Technical Problem

Based on aforementioned discussions, an object of the present invention devised to solve the conventional INI problem in time domain is to provide a method of using the same number of subcarriers and the same (common) CP across all services for the multi-service broadcast radio channel and an apparatus that implements the method within a MIMO base station transmitter without introducing additional componentry to the receiver in the UE.

Technical Solution

According to an aspect of this invention, the complexity is reduced, and at the same time, INI is eliminated. There is a single ZF precoder regardless of the number of services. The innovative concept is to perform ZF precoding across all possible subcarriers regardless of whether they are being used by a service or not. To enable this simple concept, a "frequency resampling" operation is performed before precoding to equalize the number of subcarrier usage across all services. The FFT size of the service, $S_0$, that uses the largest number of subcarriers (and hence the longest OFDM symbol) is taken as the 'reference' FFT size, $N_0$. The 'reference' can be, by default, numerology zero or the lowest numerology of active services. The frequency resampling operation is performed for the $i^{th}$ service, $S_i$, in its Frequency Re-sampler, $V_i$. First, $V_i$ performs $L_i$ times $N_i$ IFFT operation for a given $S_i$, that uses $N_i$ subcarriers of numerology say $\mu_i$—corresponding symbol duration is $D_i$ and CP duration is $CP_i$ (see TABLE 1)—and obtain the corresponding time domain samples. Then, these time domain samples are converted back to the frequency domain, but with a 'common' FFT size of $N_0$ (indicative of common number of subcarrier usage). This in effect results in multiple concatenated $L_i$ OFDM symbols at a subcarrier to become one large OFDM symbol prior to ZF precoding. Note that no frequency resampling is needed for the reference service. All other services with smaller FFT sizes are converted into the reference FFT size before precoding. In this case, regardless of the number of different types of services, only $(M_T M_R N_0)$ number of channel precoding is needed as the number of subcarriers is equalized across all services.

As an example, let the reference service be denoted by $S_0$ and have an FFT size of $N_0$. The $i^{th}$ service, $S_i$ has an FFT size of $N_i = N_0/L_i$, where $L_i$ is an integer. Note that the FFT size is a direct indicative of the numerology selected by the service. A higher the numerology corresponds to lower the FFT size. In $S_i$, the number of samples are taken back to the frequency domain for $N_0 = L_i * N_i$ samples. The precoder is designed over $N_0$ subcarriers for all services. After precoding, an IFFT operation with size $N_0$ is performed as if one OFDM symbol of this size is to be transmitted. Thus, the added CP is the same for all services and its size is equal to that of the largest service, i.e., $CP_0$. Only service $S_0$ will have one CP ($CP_0$) per symbol. All other services, $S_i$, will have the common $CP_0$ encapsulating $L_i$ number of symbols that correspond to $S_i$'s numerology.

At the receiver side, the $CP_0$ for a UE belonging to $S_i$ is removed every $L_i$ OFDM symbols. This is the only difference at the receiver side compared to conventional OFDM receivers. Therefore, in general, the complexity is reduced in the proposed scheme compared with the prior art where each service has its own precoder.

The implementation according to this invention requires the receiver to know about common CP use, i.e., $CP_0$ removal every $L_i$ symbol for service type $S_i$. The use of common CP can be pre-programmed to each receiver. In this scenario, all receivers use common CP, by default. In some cases, e.g., when the base station has an array of very large number of antennas, the transmitter may prefer to use variable size CP as known in prior art simply because the BER on the channel will be low. In other cases, e.g., when the base station has small number of antennas, the transmitter may elect to use only common CP because the BER of the channel is high.

The use of common CP can also be communicated to the receiver by the transmitter at the time UE establishes a connection to its serving base station. The transmitter in the base station may receive a control message from the receiver in the UE requesting physical layer resource configuration information. In turn, the transmitter transmits a control signal providing the resource configuration for a plurality of candidate service configurations, including data such as the frequency sub-band, the subcarrier spacing (numerology), number of subcarriers to use, $N_i$, the cyclic prefix $CP_i$ or common $CP_0$, the number of OFDM symbols in a frame between successive CPs, $L_i$. The transmitter may elect to transmit a control message providing the first resource configuration data corresponding to common CP usage specifically to ultra-reliable and low-latency (uRLL), second configuration data associated with enhanced mobile broadband (eMBB), and third configuration data associated with mMTC service.

Note that such physical layer resource configuration is needed if the UE is not configured for use of common CP for all services. Said resource configuration information includes other service specific information such as the subcarrier spacing along with common CP.

All such flexibilities (and others not mentioned here) on resource configuration of the transmitter and receiver for the use of common CP based on number of antennas, receiver capabilities, and service mix are trivial extensions and thus covered by this invention.

In patent application WO2017123045 A1 by Nam et al. describes a method between the transmitter and receiver, for the receiver to request the physical layer resource configuration pertaining multiple services according service numerologies. Each of the plurality of candidate configurations includes at least one cyclic prefix (CP), several an orthogonal frequency division multiplexing (OFDM) symbols in a subframe, or a duration of a subframe.

In U.S. Pat. No. 8,577,299 B2, Agrawal et al. describes a method by which the CP length can be modified from time to time by the base station from a list of multiple CP lengths for a single service network.

In KR101460107 B1, Kwak et al. describes a method for changing the cyclic prefix length of the base station, wherein the length of the cyclic prefix is flexibly changed according to the channel state, thereby efficiently coping with the channel condition changes, and maintaining a stable connection. The base station informs the UE of the length of the cyclic prefix so that symbol synchronization can be efficiently obtained.

In patent US 20190379488 A1, Demir et al. describes a method for adaptively changing the guard band and guard duration to address INT reduction in a multi-numerology network.

In patent application WO2017147021 A1 Yoo et al. describes an apparatus that includes means for communicating with a wireless device using a signal with a first CP length, means for receiving a dynamic CP indication in each of a predetermined number of data packets, and means for communicating with the wireless device using the signal with a second CP length based at least in part on the dynamic CP indication.

Although the prior art disclosed above teaches changing the CP length or guard duration for numerous reasons, or communicating multiple CP lengths to UE, none of the prior art describes the use of a frequency re-sampler to enable usage of the same CP, aka common CP that corresponds to that of the lower numerology reference service that BS selects. Furthermore, the references do not teach the communications to UE the common CP usage and the behavior of UE according to received common CP method.

Advantageous Effects

According to the embodiment of the present invention, the base station transmitter exhibits much less complexity in supporting multiple service types. Eliminating additional precoders and precoding that would otherwise be needed by implementing a common CP according to invention reduces computation load. Furthermore, the Bit Error Rate (BER) is significantly improved for high SNR.

It will be appreciated by persons skilled in art that the effects that could be achieved with present invention are not limited to what has been particularly described here. Other advantages can be clearly understood from the following detailed description.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

Figure 1:
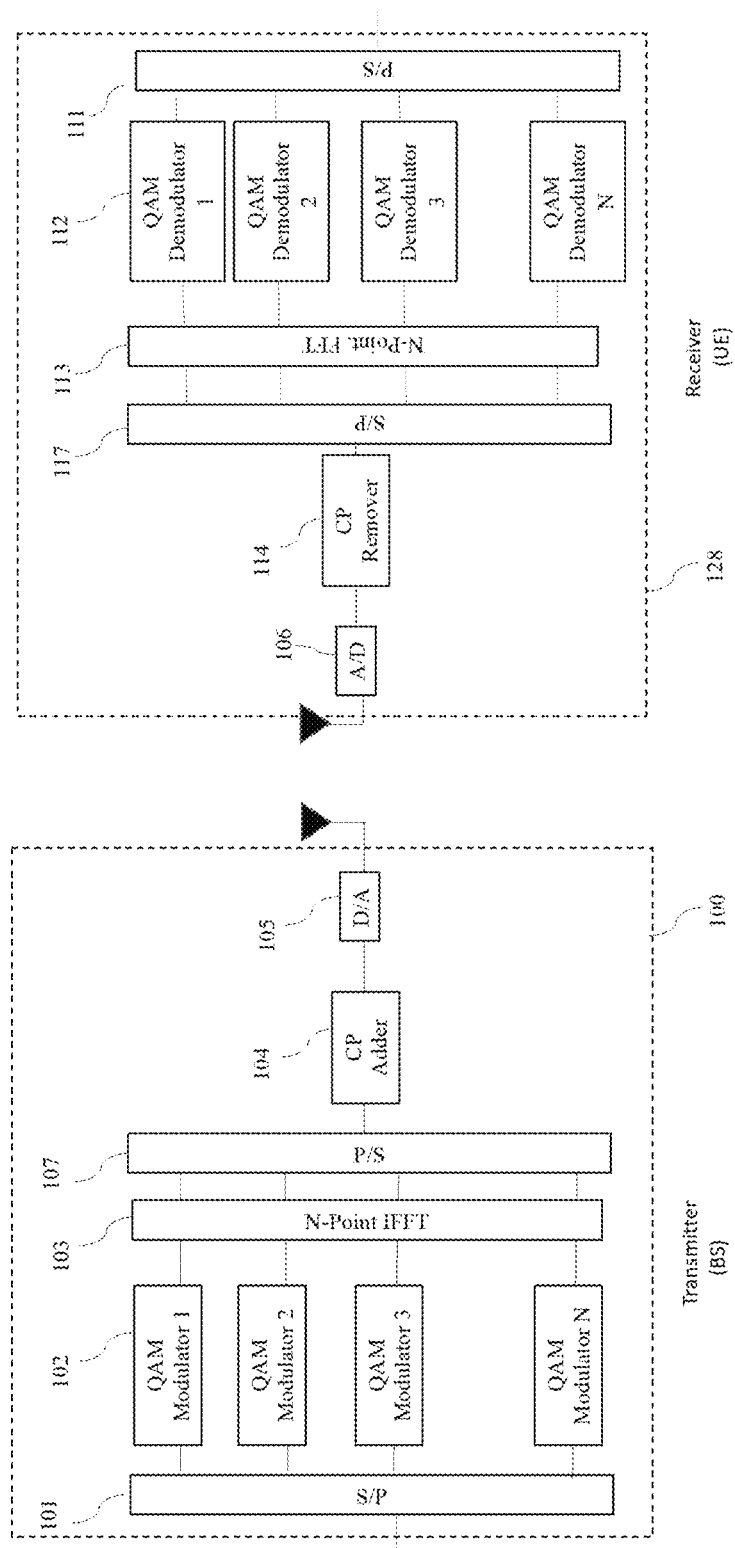
FIG. 1 is a diagram illustrating a simple prior art configuration of TX and RX.

Below is a list of acronyms used in the instant application:
A/D Analog to Digital
3GPP 3$^{rd}$ Generation Partnership Program
BER Bit Error Rate
BPSK Binary Phase Shift Keying
BS Base Station
CP Cyclic Prefix
CSI Channel State Information
D/A Digital to Analog
DL Down Link
eMBB Enhanced Mobile Broadband
FFT Fast Fourier Transform
IFFT Inverse Fast Fourier Transform
INI Inter Numerology Interference
IoT Internet of Thing
ISI Inter Symbol Interference MIMO Multi Input Multi Output
mMTC Massive Machine Type Communications
OFDM Orthogonal Frequency Division Multiplexing
QAM Quadrature Amplitude Modulation
RAN Radio Access Network
RF Radio Frequency
RX Receiver
SISO Single Input Single Output
SNR Signal to Noise Ratio
TX Transmitter
UE User Equipment
uRLLC Ultra-Reliable Low-Latency Communications
ZF Zero Forcing

DETAILED DESCRIPTION OF THE EMBODIMENTS

The first aspect of invention is a method executed in a transmitter of an OFDM base station in a wireless radio access network sending data over broadcast radio channel to a plurality of User Equipment (UE) for first service type using a lower numerology (reference service) and second service type using a higher numerology, first service type having been defined as using $N_0$ number of subcarriers, subcarrier spacing of $\Delta f_0$, and cyclic prefix duration of $CP_0$ and second service having been defined as using $N_1$ number of subcarriers, subcarrier spacing of $\Delta f_1$ a and cyclic prefix duration of $CP_1$, wherein $L=N_0/N_1$, $CP_1=CP_0/(N_0/N_1)$ and L is an integer that is positive powers of 2, said transmitter applying the steps of: (a) taking $N_1$ point Inverse FFT of modulated frequency domain symbols of second service to create corresponding $N_1$ time domain symbols for L times. Subsequently, multiplexing time domain symbols to create a serial symbol stream, and then, demultiplexing said stream into $N_0$ parallel symbol streams; (b) Taking $N_0$ point FFT of said $N_0$ parallel time domain symbol streams to recreate $N_0$ modulated frequency domain symbols, (c) Applying ZF precoding over $N_0$ number of subcarriers to modulated $N_0$ number frequency domain symbols of first and second services over channels generated by all transmit and receive antenna pairs; (d) Taking $N_0$ point inverse FFT of first and second service symbols to generate time domain symbols of first and second services; (e) Prepending each time domain symbol of first service with common CP of duration $CP_0$, and prepending each consecutive L time domain symbols of second service with common CP of duration $CP_0$; (f) Multiplexing prepended time domain symbols of first service into a serial stream of time domain symbols each according to first service's subcarrier spacing, $\Delta f_0$, converting each symbol to analog signals for transmission using RF chain, multiplexing prepended time domain symbols of second stream into a serial stream of time domain symbols each according to second service's subcarrier spacing, $\Delta f_1$, and converting each symbol to analog signals for transmission using RF chain.

The second aspect of this invention is to apply the common CP across many services by selecting the lowest numerology service as the reference service, the steps of the method following the same method steps described in the first aspect of invention.

The third aspect of this invention is a physical layer resource configuration method executed in an OFDM base station in a cellular radio access network sending data on broadcast radio channel to a User Equipment for a plurality service types each service using a different numerology, said configuration method has the steps of: (a) User Equipment sending a message to OFDM base station requesting physical layer resource configuration to use for a service type; (b) OFDM base station responding with a message that includes at least resource configuration that species $N_i$ number of subcarriers, subcarrier spacing of $\Delta f_i$, and common cyclic prefix duration of $CP_0$ per $L_i$ symbols wherein said requesting and responding apply to a single service type, or a plurality of service types, or service types identified by service numbers or service names such as mMTC, uRLLC and eMBB.

A fourth aspect of this invention is an OFDM base station transmitter system sending data on a broadcast radio channel to a plurality of User Equipment belonging to at least two different service types such that first service (reference service) is of lower numerology $N_0$ than the second service of higher numerology $N_1$, said system comprising components of: (a) A frequency re-sampler subsystem executing the following sequential steps to only second service of (i) taking L times $N_1$ point Inverse FFT of modulated frequency domain symbols of second service to create corresponding $N_1$ time domain symbols, (ii) multiplexing obtained time domain symbols to create a serial symbol stream, (iii) demultiplexing said stream into $N_0$ parallel symbol streams, and (i) taking $N_0$ point FFT of said $N_0$ parallel time domain symbol streams to create $N_0$ modulated frequency domain symbols; (b) A ZF precoder subsystem applying precoding over $N_0$ number of subcarriers to modulated frequency domain symbols of first service and second service; (c) An IFFT subsystem taking $N_0$ point inverse FFT of first service symbols and second service symbols to generate time domain symbols of first service and second service; (d) A common CP Adder subsystem prepending each time domain symbol generated of first service with a CP of duration $CP_0$. Prepending each consecutive L time domain symbols of second service with a CP of duration $CP_0$; (e) A physical resource configurator subsystem that configures a UE for a plurality of services according to use of common CP for all numerologies according to third aspect of this invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Radio Access Network (RAN) has many more components than those described in this disclosure. Those components are omitted so that the invention is easy to understand. Furthermore, other parts of a new generation cellular network such as the data plane and control plane of the core network are also omitted as those parts are not relevant to invention.

MIMO is the acronym for Multiple Input Multiple Output. This means that the radio is split up in multiple identical radio frequency (RF) chains that can all transmit and receive data individually and simultaneously with a plurality of antennas. More data can, therefore, be sent or received simultaneously, or alternatively the same data can be sent or received several times for reliable transmission. A radio frequency (RF) chain may include a broad range of discrete components such as attenuators, switches, amplifiers, detectors, synthesizers, and other analog components along with A/D and D/A converters. In what follows, subcomponents specific to RF chain that are well known in prior art are also omitted to keep the descriptions focused on invented methods and subcomponents. Furthermore, at higher frequencies the sizes of antennas decrease where many antennas might be compacted in a small volume. The increase in the number of elements makes it costly to have a dedicated RF chain for every single antenna. Therefore, the number of RF chains might be less than that of antenna elements. This feature is enabled by an RF precoder which is well known in prior art. However, for the sake of simplicity, the number of antennas is assumed to be the same as the number of RF chains, $M_T$ since RF precoder is out of scope. The number of RF chains and antennas are thus used interchangeably.

Furthermore, functionalities according to several embodiments of this invention are grouped as transmitter functions of a base stations for simplicity, wherein in another embodiment of this invention some functionalities may belong to subsystems of the base station other than the transmitter.

In some embodiment, the subcarrier spacing in OFDM refers to the frequency interval between allocated subcarriers. Through the subcarrier spacing, OFDM enables data transmission while maintaining orthogonality among subcarriers. LTE supports only one subcarrier spacing that is fixed at 15 kHz. The 'numerology' refers to how to configure a unit of radio access network resource in time domain. LTE RAN uses a single numerology with 15 kHz as the subcarrier spacing, while OFDM RAN uses various numerologies each one supporting a different subcarrier spacing (an integer multiple of 15 KHz) to support a wide frequency range up to 100 GHz and hence wider bandwidth than LTE, and various service types eMBB, uRLL, and mMTC with varying requirements.

In some embodiments, an OFDM symbol duration comprises a cyclic prefix (CP) duration and a duration for the symbol in time-domain in a unit of microseconds. The transmitted OFDM symbol duration is determined as the sum of the two durations for the CP and the output of IFFT.

In some embodiments, a UE is configured to receive the two services but configured with the same set of numerology parameters for these two services. In some embodiments, a UE is configured to receive the two services but configured with two different sets of numerology parameters for these two services. In such embodiments, the numerology parameters include at least one of the CP length, the subcarrier spacing, OFDM symbol length, FFT size (indicative of the number of subcarriers used).

Figure 2:
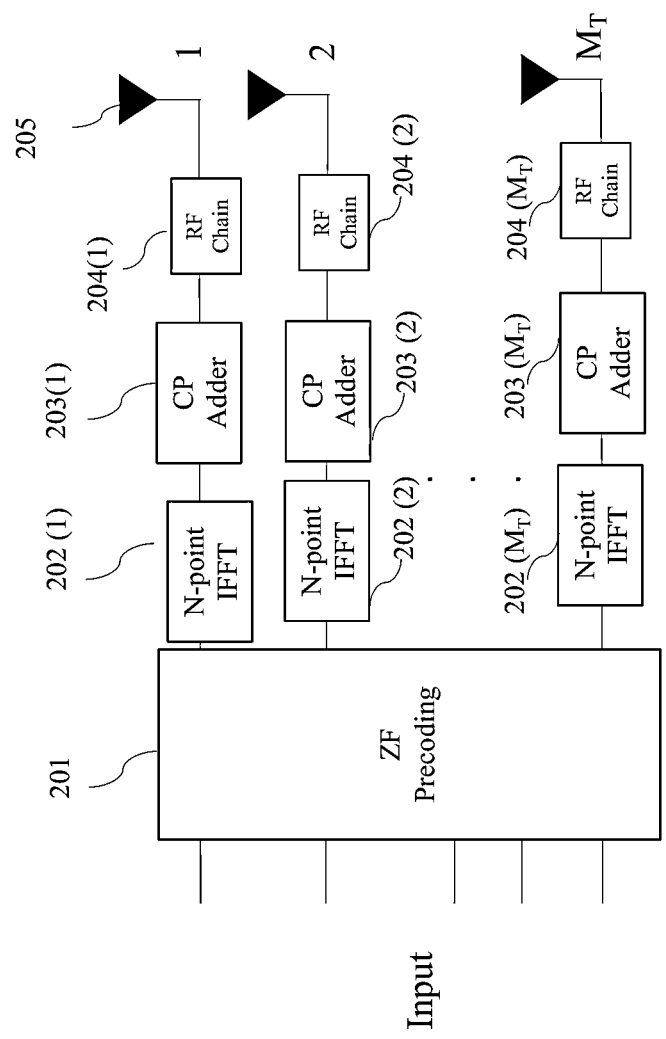
FIG. 2 is a diagram illustrating key modulation functions of a MIMO TX for a single service.

FIG. 2 illustrates the block diagram of a prior art transmitter of an OFDM MIMO base station with $M_T$ number of RF chains (assuming equal to number of antennas) and a single type of service (assuming at numerology 0: subcarrier spacing is 15 KHz). The input data is a series of bits that arrive at the base station from the core IP network. These bits are first converted to frequency domain symbols using a QAM modulator as depicted in FIG. 1. The modulators and S/P multiplexers are omitted from the diagram for simplicity.

The input to ZF Precoding 201 is a series of symbols parallelized on a per subcarrier basis wherein subcarrier spacing is 15 KHz. ZF Precoding 201 multiplies each arriving symbol with the inverse of the that subcarrier's channel state information (CSI) and sends these processed symbols as inputs to N-point inverse FFT 202 (we assumed the number of subcarriers being equal to FFT size N). Block 203 adds the same duration CP to each time domain symbol. After multiplexing of all symbols from all subcarriers, Block 204 performs all RF Chain functions to translate discrete time symbols to actual analog radio signals and transmits them using antenna 205.

In a MIMO base station, above operations are performed across all RF chains. This parallelization is needed as ZF precoding may see different channel characteristics as reflected by each base station RF chain (1, 2, . . . , $M_T$) and each UE RF chain (1, 2, . . . , $M_R$) that are causing radio signals in spatially different directions. Therefore, there are ($M_T M_R$) distinct radio paths to consider. Furthermore, ZF Precoding performs precoding for each subcarrier resulting in ($M_T M_R N$) computations per input stream of symbols.

Figure 3:
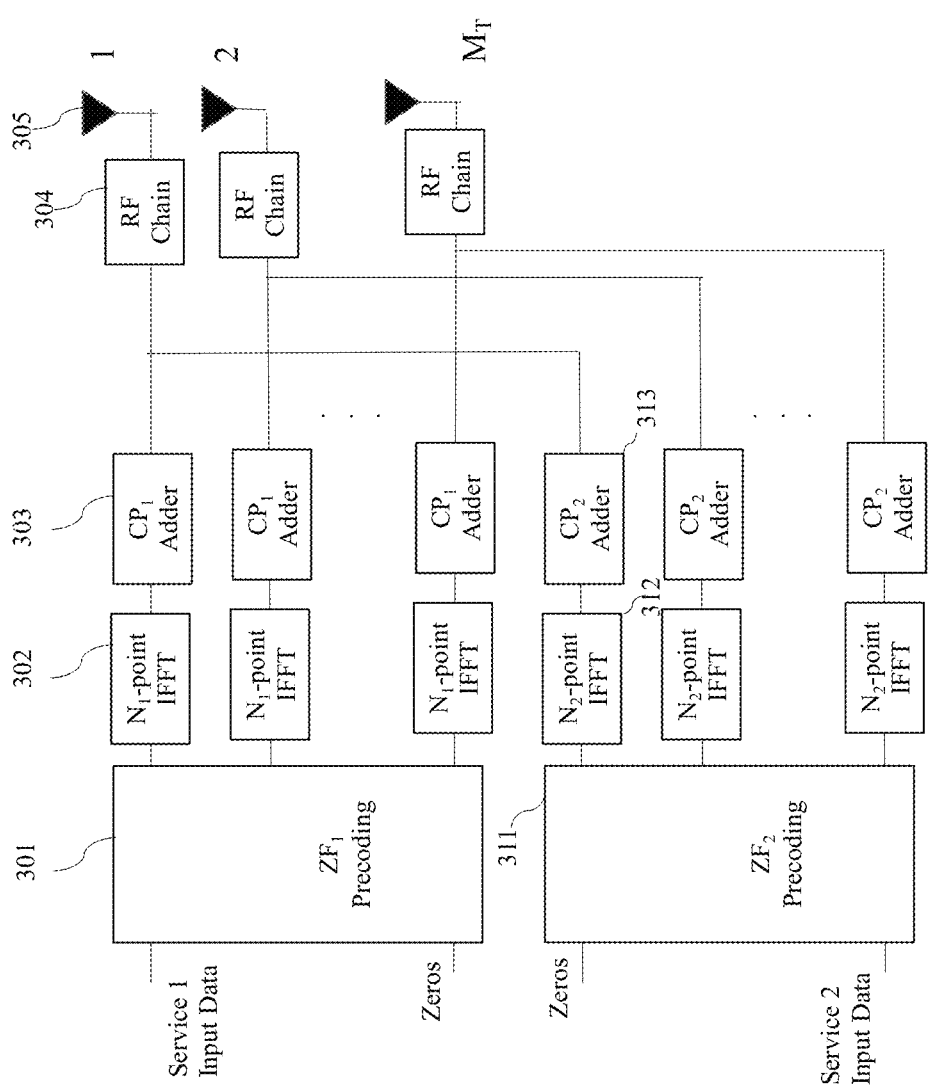
FIG. 3 is a diagram illustrating simple prior art configuration for removing INI.

FIG. 3 illustrates the block diagram of a prior art transmitter of an OFDM MIMO base station with $M_T$ number of antennas and two types of service with two numerologies and corresponding different FFT sizes, $N_1$ and $N_2$, and different CP sizes, $CP_1$ and $CP_2$. The input data is a series of bits that arrive at the base station from the core IP network. These bits are first converted to frequency domain symbols using a QAM modulator as depicted in FIG. 1. The modulators and S/P multiplexers are omitted from the diagram for simplicity.

The input to ZF Precoding 301 is a series of symbols parallelized on a per subcarrier basis according to the first service's subcarrier spacing. ZF Precoding 301 multiplies each arriving symbol with the inverse of the that subcarrier's channel state information (CSI) and sends these processed symbols as inputs to $N_1$-point inverse FFT 302. Block 303 adds $CP_1$ to each time domain symbol. All symbols from all subcarriers are then multiplexed.

A parallel process is executed by ZF Precoding 311 to the second service. ZF Precoding 311 multiplies each arriving symbol with the inverse of the that subcarrier's channel state information (CSI) and sends these processed symbols as inputs to $N_2$-point inverse FFT 312 (we assumed the number of subcarriers being equal to FFT size). Block 313 adds $CP_2$ to each time domain symbol. After multiplexing of all symbols from all subcarriers. Block 304 performs the RF Chain functions to the merged symbols and translate discrete time symbols to analog radio signals. Analog signals are sent to antenna 305.

The total number of ZF precodings according to prior art configuration of FIG. 3 when there is a reference service $S_0$ with $N_0$ subcarriers, and other p number of services each with different numerology, having $N_i$ subcarriers, where $L_i = N_0/N_i$ is:

$$M_T M_R N_0 + \Sigma_{i=1}^{p}(M_T M_R (L_i N_i)) \quad \text{(Eq. 1)}$$

The number of IFFT operations according to said prior art configuration is:

$$M_T N_0 \log_2(N_0) + M_T \Sigma_{i=1}^{p}(L_i N_i \log_2(N_i)) \quad \text{(Eq. 2)}$$

wherein $N_0 \log_2(N_0)$ is the number of IFFT operations are performed for service $S_0$ per antenna and $L_i N_i \log_2(N_i)$ is the number of IFFT operations per each service $S_i$ per antenna. The number of IFFT formulas are well-known in prior art.

Figure 4:
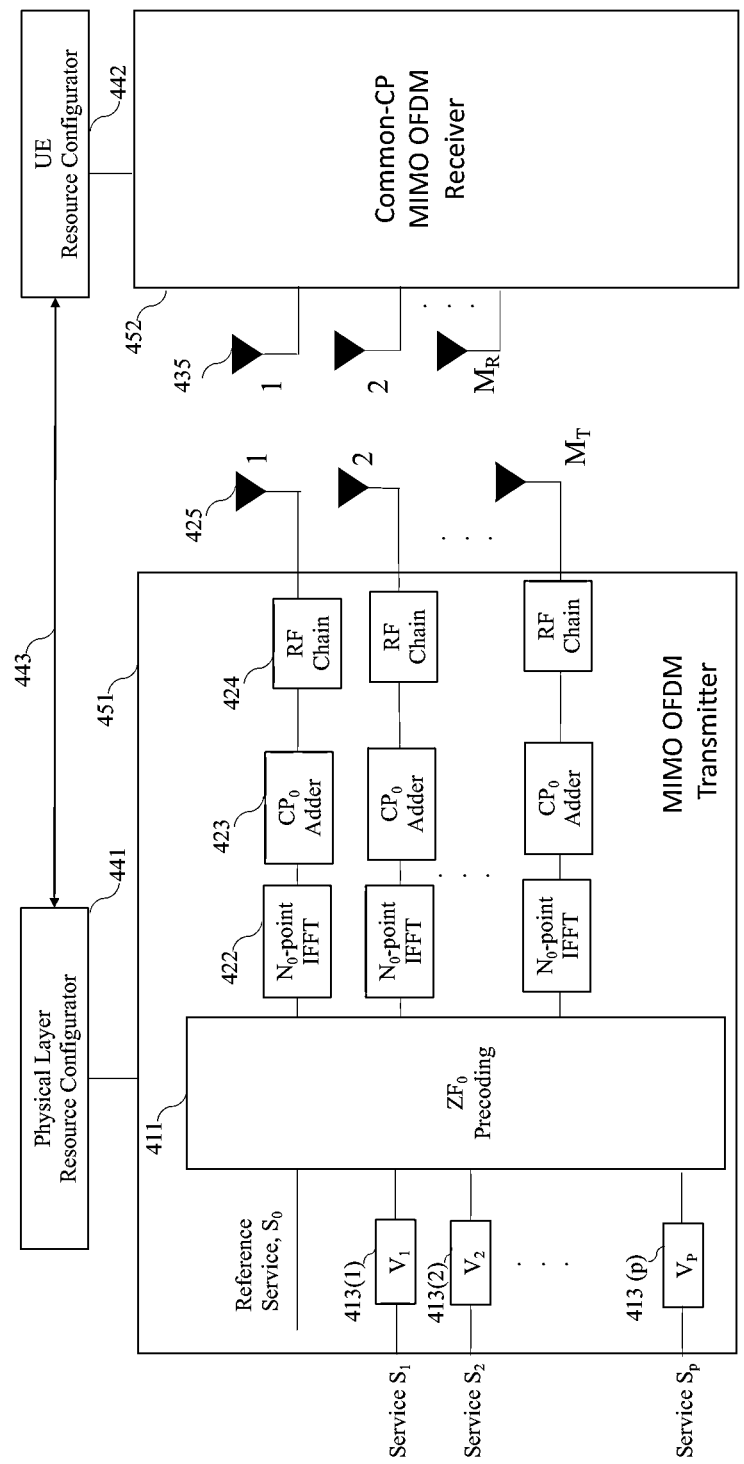
FIG. 4 is a diagram illustrating the modulation configuration of TX for removing INI according to invention.

FIG. 4 illustrates the block diagram of the OFDM MIMO base station with transmitter 451, $M_T$ number of antennas 425, Physical Layer Resource Configurator 441, and a plurality of services, $S_0, S_1, \ldots, S_p$ according to invention.

The UE is represented by common CP MIMO OFDM receiver 452 with $M_R$ antennas 435, and UE Resource Configurator 442. The services use different numerologies and different FFT sizes, $N_1, N_2, \ldots, N_p$ and a common CP size, $CP_0$, that correspond to reference service $S_0$. The bit streams of each service (except reference service) first traverse Frequency Re-sampler 413, before ZF precoding. After frequency resampling all streams are essentially redistributed to $N_0$ subcarriers. Thereafter, $N_0$-point FFT 422 and $CP_0$ Adder 423, and RF Chain 424 process the symbols just as in the FIG. 3. The only difference is that now all services are mapped to equal number of subcarriers.

FIG. 4 illustrates Physical Layer Resource Configurator 441 subsystem which may be a subcomponent of the transmitter. Alternatively, it may be a subcomponent of another component of the base station. It communicates with UE Resource Configurator 442 to set the transmit parameters such that UE is informed on usage of common CP on downlink channel. The messaging is performed on radio link 443 which may be a dedicated subchannel for control messaging or a subchannel shared with other control messages between the BS and UE.

In one embodiment, the transmitter in the base station operates only according to common CP of this invention as illustrated in FIG. 4 (single mode). In another embodiment, the transmitter in the base station is 'dual-mode', i.e., accommodates both common CP method and the prior art method of variable CP that is illustrated in FIG. 3. Dual-mode transmitter can switch from common CP mode to variable CP mode, or vice versa, or it can be pre-configured according to either common CP mode or variable CP mode. The dual-mode is beneficial when the UEs don't support common CP, or when the base station has some operational reasons for preferring variable CP.

One method of dual-mode transmitter using variable CP is activating componentry such as the additional ZF precoders and per-service IFFT operations (shown in FIG. 3) while deactivating Frequency Re-samplers (shown in FIG. 4). Another method of dual-mode transmitter using common CP is deactivating componentry such as the additional ZF precoders and per-service IFFT operations while activating Frequency Re-samplers.

Figure 5:
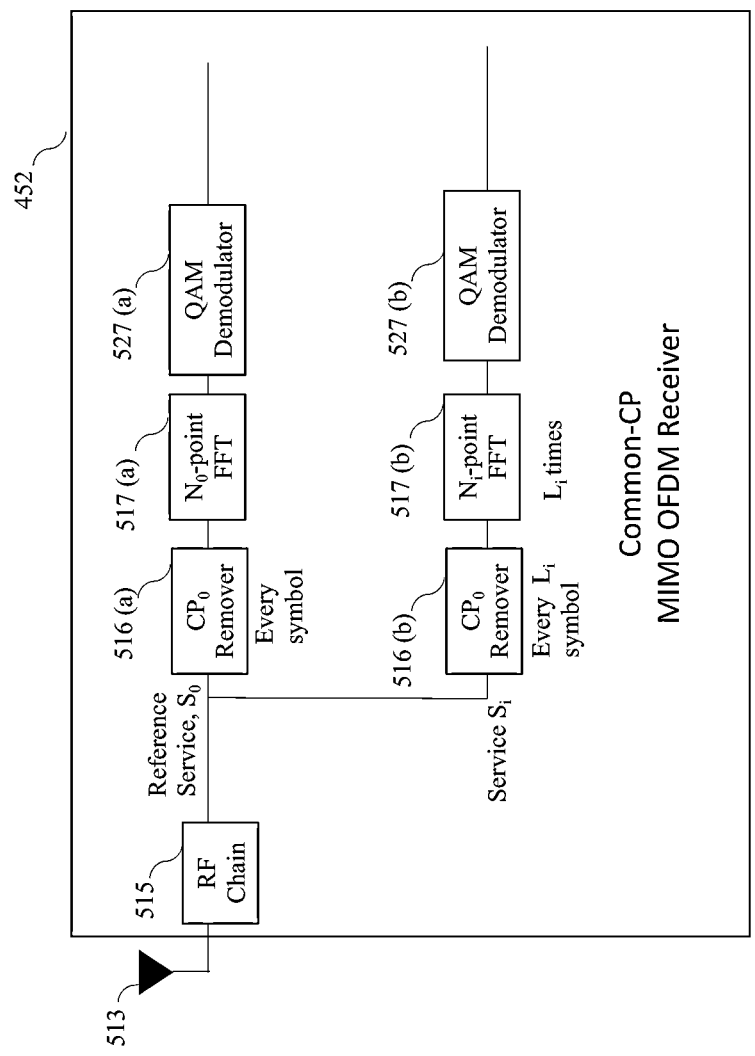
FIG. 5 is a diagram illustrating the configuration of RX according to invention

FIG. 5 illustrates the block diagram of receiver 452 at the UE. For services $S_0$ and $S_i$, UE choses to use the RF streams coming from antenna 513 amongst the plurality of antennas because the received radio signal has the highest power. RF Chain 515 converts received analog symbols to discrete symbols. $CP_0$ Remover 516(a) removes the common CP from every symbol for service $S_0$. Subsequently, $N_0$-point FFT 517(a) converts time domain symbols to frequency domain symbols. Finally, QAM Demodulator 527(a) converts each symbol into a series of bits. On the other hand, $CP_0$ Remover 516(b) removes the common CP from every $L_i$ symbol for service $S_i$. Subsequently, $N_i$-point FFT 517(b) converts these $L_i$ symbols from time domain to frequency domain symbols. Finally, QAM Demodulator 527(b) converts each symbol into a series of bits. Aforementioned functions for each service type can be implemented by the same components, i.e., CP Remover 517(a) and (b) may be the same component, or different parallel components. Different hardware and software implementation of these functions are possible and covered by this invention.

Figure 6:
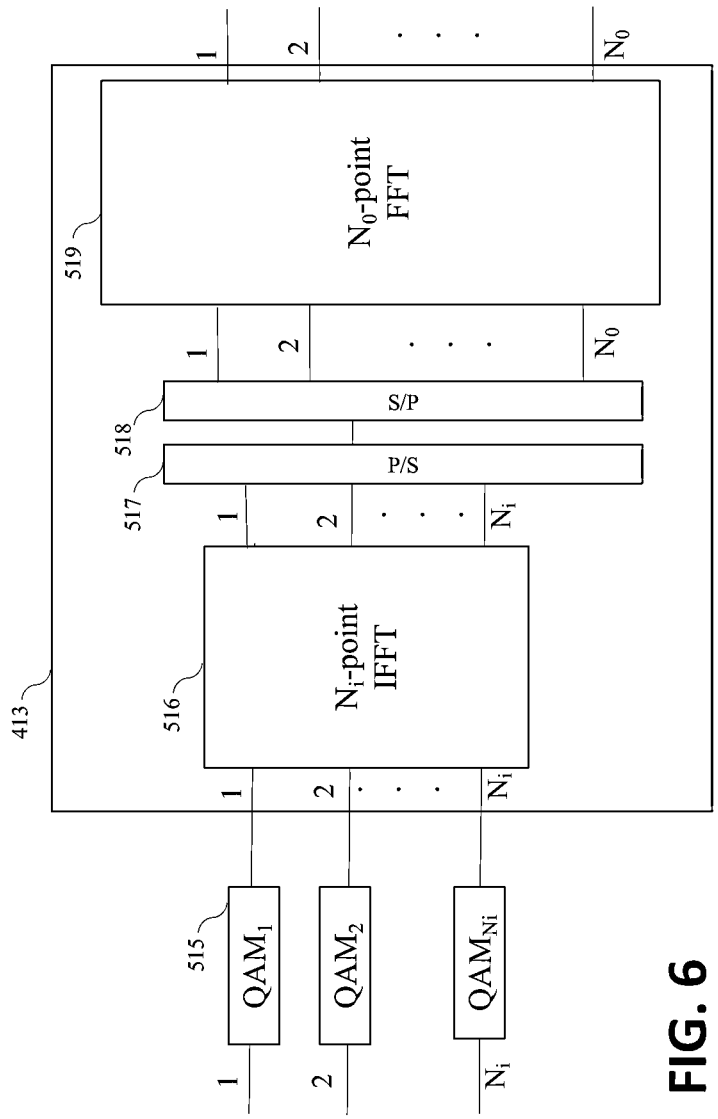
FIG. 6 is a diagram illustrating the Frequency Re-sampler according to invention.

FIG. 6 illustrates a simple block diagram of Frequency Re-sampler 413 shown in FIG. 4 the function of which is to translate a bit stream modulated to $L_i N_i$ frequency domain symbols to $N_0$ frequency domain symbols spread across $N_0$ subcarriers. The embodiment is for illustration of functionality only. After parallelizing the bit stream $N_i$ bit streams, $QAM_1$ to $QAM_{Ni}$ 515 translates them into $N_i$ symbol stream and feed as input to Frequency Resample 413. Subsequently, $N_i$-point IFFT 516 subsystem converts the modulated symbols into $N_i$ time domain symbols. This process is repeated $L_i$ times. P/S 517 multiplexes the symbols into a serial symbol stream which is then demultiplexed to $N_0$ streams by S/P 518. $N_0$-point FFT 519 subsystem takes these $N_0$ time domain symbols as input and translates them back to $N_0$ frequency domain symbols to be spread to $N_0$ subcarriers.

The total number of ZF precodings according to embodiments of this invention when there is a reference service $S_0$ with $N_0$ subcarriers, and other p number of services of different numerology, each service of different numerology having $N_i$ subcarriers, and $L_i = N_0/N_i$ is:

$$M_T M_R N_0 \qquad (Eq.\ 3)$$

The corresponding total number of IFFT and FFT operations according to invention is:

$$M_T N_0 \log_2(N_0) + \Sigma_{i=1}^{P}(L_i N_i \log_2(N_i) + N_0 \log_2(N_0)) \qquad (Eq.\ 4)$$

wherein the first term of $M_T N_0 \log_2(N_0)$ is the number of IFFT operations that are performed for $M_T$ antennas. The second term has $(L_i N_i \log_2(N_i) + N_0 \log_2(N_0))$ that is the number of back-to-back IFFT and FFT operations, respectively, performed by each Frequency Re-sampler $V_i$.

Just to give a measure of complexity reduction with the present invention Eqs. 1 and 3 are compared, and the number of precoding savings with the invention is determined to be $\Sigma_{i=1}^{P}(M_T M_R(L_i N_i))$. Similarly, comparing Eqs. 2 and 4, the number of FFT/IFFT operations savings with the invention is $(M_T \Sigma_{i=1}^{P}(L_i N_i \log_2(N_i)) - \Sigma_{i=1}^{P}(L_i N_i \log_2(N_i) + N_0 \log_2(N_0)))$ wherein the first term dominates with large number of antennas in MIMO transmitter configurations.

Figure 7:
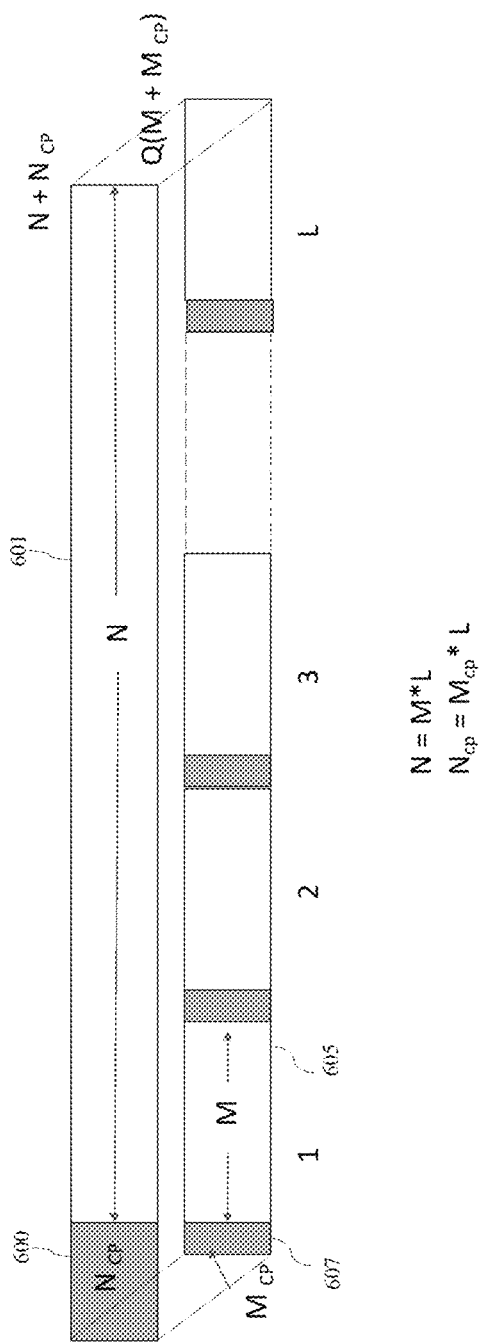
FIG. 7 is a diagram illustrating the prior art CP for two services.

FIG. 7 illustrates example symbol structures in the time domain for a RAN to support two different services according to prior art wherein the two services use different numerologies. An embodiment of the frame structure for a network to support two services shown in FIG. 7 is for illustration only. Service 1 uses a symbol length of N with a CP length of $N_{cp}$. Service 2 uses a symbol length of M with a CP length of $M_{cp}$. These lengths are durations and predefined by the numerology selected for the service type associated with Service 1 and 2. Note that $N_{cp}/M_{cp}$ is the same as N/M, and represented by an integer number L (note that N and M are integer powers of 2). Stated otherwise, when the symbol length decreases the corresponding CP decreases proportionally. The UE receiving Service 1 and Service 2 symbols removes the corresponding CPs and retrieve the actual symbols of lengths N and M, respectively. Note that Service 1 and Service 2 uses different subcarrier spacing and different number of subcarriers according to their numerology. For example, Service 1 may use numerology 0 with subcarrier spacing of 15 Khz and FFT size of 4096, and Service 2 may use numerology 1 with subcarrier spacing 30 KHz and FFT size of 2048.

Figure 8:
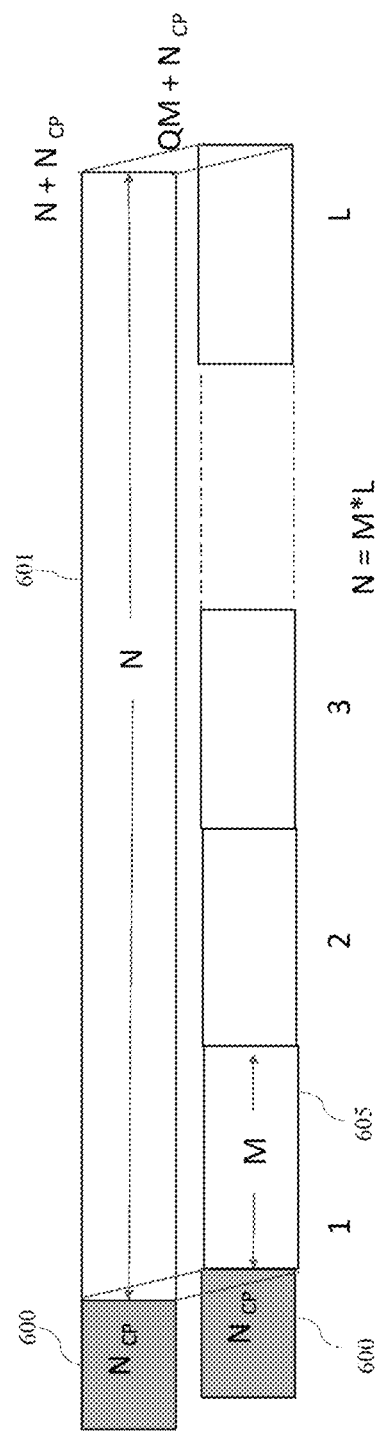
FIG. 8 is a diagram illustrating the common CP for two services according to invention.

FIG. 8 illustrates example symbol structures in the time domain for a RAN to support two different services according to invention wherein the two services use different numerologies. An embodiment of the frame structure for a network to support two services shown in FIG. 8 is for illustration only. Service 1 uses a symbol length of N with a CP length of $N_{cp}$. The common CP length, $CP_0$ is $N_{cp}$ assuming that Service 1 is the reference service $S_0$. Service 2 uses a symbol length of M where N/M=L and L in an integer. These lengths are predefined by the numerology selected for the service type associated with Service 1 and 2.

Note that these M symbols use only one CP that is the common CP. Stated otherwise, the symbol length decreases from N to M, but the corresponding CP that covers M symbols stay as constant length. The UE receiving Service 1 removes the corresponding CP of length $N_{cp}$ for each symbol and retrieve the actual symbol of length N. The UE receiving Service 2 however removes the corresponding CP of length $N_{cp}$ for every M symbol and retrieve the actual symbol of length M for L consecutive symbols thereafter. Note that Service 1 and Service 2 uses different subcarrier spacing and different number of subcarriers with their respective subcarrier spacing. For example, Service 1 may use numerology 0 with subcarrier spacing of 15 Khz and 4096 subcarriers, and Service 2 may use numerology 1 with subcarrier spacing 30 KHz and 2048 subcarriers.

Figure 9:
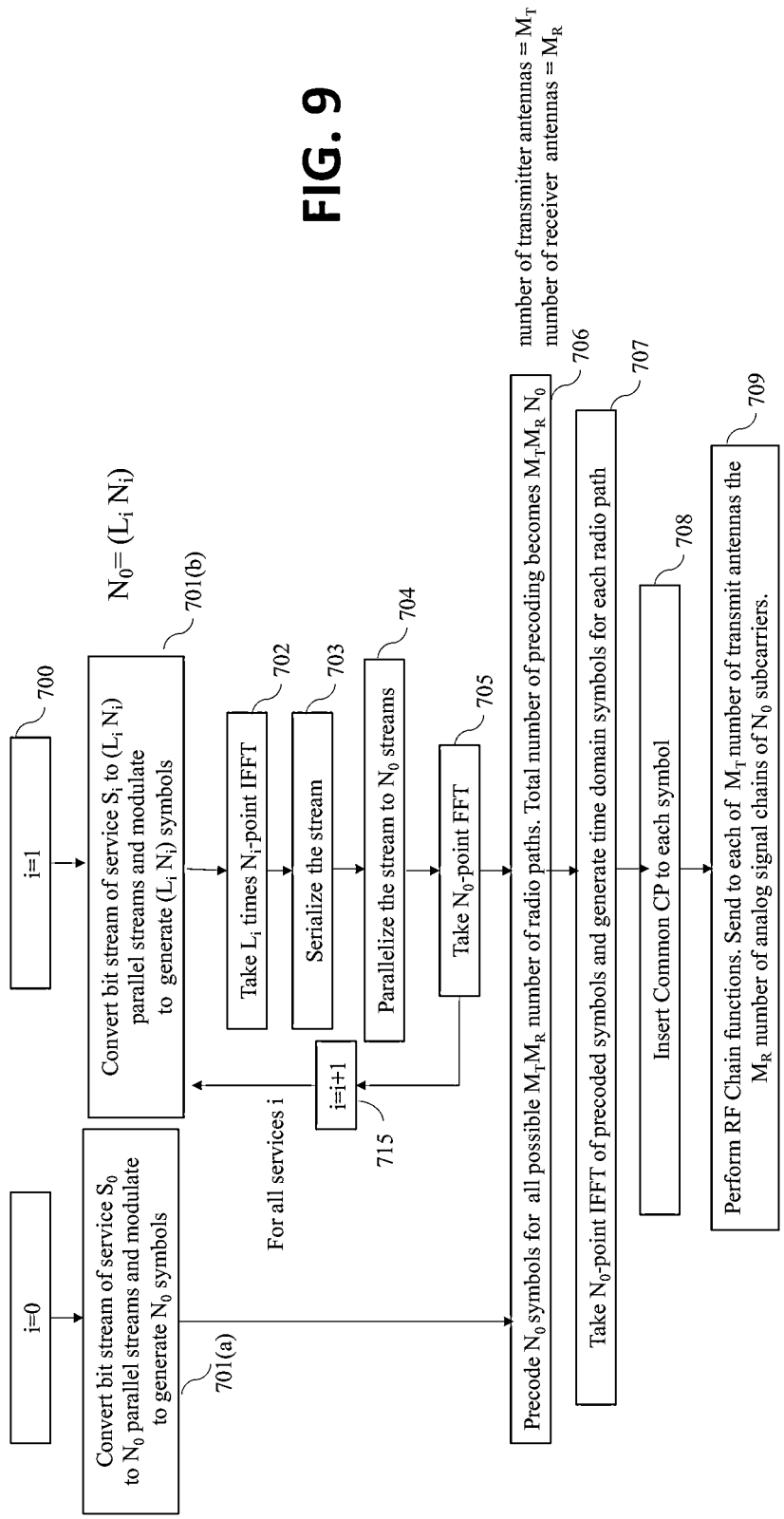
FIG. 9 is a diagram illustrating a method of the TX according to invention.

FIG. 9 shows a simple flow chart depicting key steps of the frequency resampling at the base station transmitter according to an aspect of this invention that enables common CP usage across all services. Two distinct paths are shown: First path starts with i=0 for the reference service, $S_0$, for which frequency resampling process is not needed. Second path starts with i=1 for service $S_i$ (i=1, 2, . . . ) for which frequency resampling must be applied. Note that for a plurality of non-reference services i the process loop of 715 repeats.

Step 701(*a*) converts the bit stream of service $S_0$ into $N_0$ modulated parallel steam of symbols prepared for precoding. Similarly, step 701(*b*) converts the bit stream of service $S_i$ into Li $N_i$ modulated parallel steam of symbols prepared for resampling. At step 702, $N_i$-point IFFT is taken for $L_i$ times to convert the symbol stream to time domain. The stream is serialized first and then parallelized to create $N_0$ streams in step 704. Step 705 takes $N_0$-point FFT of the stream to convert the symbols back to frequency domain.

Step 706 is common for all services. It performs the ZF precoding of symbols distributed to $N_0$ subcarriers and transmitted by any transmit-receive antenna pair. Subsequently, pre-coded symbols are converted to time domain in step 707, and common CP is inserted to each symbol. This process in essence causes one CP per symbol of the reference services, and one CP per $L_i$ symbols of the non-reference services as illustrated in FIG. 8. Finally, in step 709 each prepended time domain symbol is converted to an analog RF signal and transmitted to radio channel via the corresponding transmit antenna. With beamforming, the signals can be directed towards any receive antenna.

One or more of the components illustrated in these Figures can be implemented in specialized circuitry configured to perform the noted functions or one or more of the components can be implemented by one or more processors executing instructions to perform the noted functions. Other embodiments are used without departing from the scope of the present disclosure.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RANI, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations such as FFT/IFFT and modulation/demodulation operations can be performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The invention claimed is:

1. A transmitter system within a base station of a radio access network sending data on a broadcast radio channel to a plurality of User Equipment belonging to at least two different service types such that a first service is of lower numerology $N_0$ than a second service of higher numerology $N_1$, wherein the transmitter comprising components of:
   a. a frequency re-sampler subsystem executing the following sequential steps of (i) taking $L_1$ times $N_1$ point Inverse FFT of modulated frequency domain symbols of the second service to create corresponding $L_1 N_1$ time domain symbols, (ii) multiplexing $L_1 N_1$ time domain symbols to create a serial symbol stream, (iii) demultiplexing said stream into $N_0$ parallel symbol streams, and (i) taking $N_0$ point FFT of said $N_0$ parallel time domain symbol streams to create $N_0$ modulated frequency domain symbols;
   b. a ZF precoder subsystem applying precoding over $N_0$ number of subcarriers to modulated frequency domain symbols of the first service and second service;
   c. an IFFT subsystem taking $N_0$ point inverse FFT of the first service symbols and the second service symbols to generate time domain symbols of the first service and the second service;
   d. a common CP Adder subsystem prepending each time domain symbol generated of the first service with a CP of duration $CP_0$, Prepending each consecutive $L_1$ time domain symbols of the second service with a CP of duration $CP_0$; and
   e. a physical resource configurator subsystem that configures UEs served by said base station for a plurality of services according to use of common CP for all numerologies.

* * * * *